United States Patent [19]

Fiore, Jr. et al.

[11] Patent Number: 5,746,020

[45] Date of Patent: *May 5, 1998

[54] RUBBER BAND AND SPRING POWERED MOUSETRAPS

[75] Inventors: Joseph F. Fiore, Jr., Lebanon; Michael J. Gehret; Gary Roulston, both of Lititz, all of Pa.; Hesham El-Khateeb, Lawrenceville, N.J.

[73] Assignee: Woodstream Corporation, Lititz, Pa.

[*] Notice: The term of this patent shall not extend beyond the expiration date of Pat. No. 5,481,824.

[21] Appl. No.: 684,690

[22] Filed: Jul. 22, 1996

Related U.S. Application Data

[63] Continuation-in-part of Ser. No. 475,993, Jun. 7, 1995, which is a continuation-in-part of Ser. No. 261,180, Jun. 13, 1994, Pat. No. 5,481,824.

[51] Int. Cl.⁶ .................................................. A01M 23/24
[52] U.S. Cl. ....................................................... 43/85
[58] Field of Search .................................. 43/77, 78, 81, 43/85, 86, 88

[56] References Cited

U.S. PATENT DOCUMENTS

| | | |
|---|---|---|
| 2,005,489 | 6/1935 | Barrett . |
| 2,059,164 | 10/1936 | Woods . |
| 2,481,800 | 9/1949 | Tyler . |
| 2,506,055 | 5/1950 | Benson . |
| 2,510,655 | 6/1950 | Price . |
| 2,562,417 | 7/1951 | De Vorsey . |
| 2,603,029 | 7/1952 | Anderson . |
| 4,122,625 | 10/1978 | Ohtsuka . |
| 4,366,642 | 1/1983 | Gardner et al. . |
| 4,991,340 | 2/1991 | Schildt . |
| 5,481,824 | 1/1996 | Fiore, Jr. . |
| 5,501,031 | 3/1996 | Heilesen .................... 43/78 |

*Primary Examiner*—Kurt Rowan
*Attorney, Agent, or Firm*—Jacobson, Price, Holman & Stern, PLLC

[57] ABSTRACT

A tunnel-type mousetrap has a central trapping mechanism powered by a rubber band or a coil spring. In the case of a rubber band, the band is wound between an anchor plate in the top wall of the tunnel and a striker plate that fits over the anchor plate and has end walls with trapping apertures that project downwardly through the tunnel. The rubber band urges the striker plate upwardly, and the trap is set by pushing down on the striker plate to engage a pivotal trigger carried by the anchor plate. When a mouse enters the tunnel and dislodges the trigger, the striker plate springs upwardly under the force of the rubber band and traps the mouse's neck in one of the trapping apertures. The trigger may be scented to attract mice and may hold a sunflower seed as additional bait. To provide the trap with a longer shelf life, the rubber band may be replaced by a coil spring fitted between the anchor plate and the striker plate.

14 Claims, 6 Drawing Sheets

RUBBER BAND AND SPRING POWERED MOUSETRAPS

CROSS-REFERENCE TO RELATED APPLICATION

This application is a Continuation-In-Part of now allowed application Ser. No. 08/475,993 filed Jun. 7, 1995, which is itself a Continuation-In-Part application of Ser. No. 08/261,180, filed Jun. 13, 1994, now U.S. Pat. No. 5,481,824 the contents of which are expressly incorporated herein by reference.

BACKGROUND OF THE INVENTION

This invention relates to mousetraps.

One of the recent trends in mousetrap design, is the provision of disposable "no-see" mousetraps comprising an enclosure, such as a tunnel, in which a mouse is trapped, and which is intended for disposal with the trapped mouse inside, so that a user does not need to view the trapped mouse or mouse's corpse. Such traps may or may not provide some type of indicator to show when a mouse has been trapped.

SUMMARY OF THE INVENTION

One object of this invention is to provide an effective mousetrap which, at least in one embodiment, can be constructed as a disposable no-see mousetrap, preferably providing an indication of when a mouse has been trapped.

Another object of the invention is to provide a tunnel-type mousetrap in which a mouse can enter from either end of the tunnel to be trapped by a central trapping mechanism.

A further object of the invention is to provide a mousetrap with a trigger mechanism which is easy to set.

Still another object of the invention is to provide a mousetrap having a rubber band-powered trigger released trapping mechanism.

Yet another object of the invention is to provide a mousetrap of like overall design to the rubber-band powered trap, but using a spring rather than a rubber band to spring the trap.

In fulfillment of the above and other objectives, the invention provides, at least in its preferred form, a mousetrap having a tunnel-like enclosure open at each end with a centrally located rubber band or spring powered trigger operated trapping mechanism. The design of the trap is such that a mouse, attracted by bait located in the region of the trapping mechanism trigger, or on the trigger itself, enters the enclosure from either end, trips the trigger mechanism and is trapped within the tunnel. The enclosure may be of a disposable nature, for example it may be of cardboard or the like or alternatively may be made of more durable material, such as metal or plastic for repeated use.

The trapping mechanism may conveniently comprise an anchor plate attached to an upper wall of the tunnel and a cage-like striker plate with a rubber band wound over parts of the respective plates, or with a coil spring fitted between the respective plates, urging the striker plate upwardly so that opposite end faces thereof approach adjacent end faces of the anchor plate. The anchor plate carries a pivotal trigger extending into the tunnel between opposite ends of the plates. The trap is set when the upwardly urged striker plate is pushed down until it is engaged and held down by the upper end of the trigger.

The trapping mechanism is configured such that when a mouse enters the tunnel from either end and moves the trigger with its head or foot, the striker plate is released and springs upwardly under the force of the rubber band or spring so that one of its end faces engages the mouse's neck from below and squeezes same against the corresponding end face of the anchor plate thereby trapping the mouse and strangling it. An indication that a mouse has been trapped is given by the top of the striker plate having risen above the level of the anchor plate.

Preferably, the trigger is pivotally mounted cross-wise of the tunnel so that it can be released by a mouse entering from either end. Also, the trap can be pre-baited, for example by impregnating the tunnel in the region of the trigger. Alternatively, the trigger itself may be baited, for example with a sun-flower seed. When a rubber band is used, the band may also be wound around the trigger in a manner whereby it urges the trigger toward a position engaging the striker plate and retaining the trigger in the set position. Alternatively, when a spring is used to power the trap, a second, small spring may be used to urge the trigger.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

In describing the preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figures 1, 3:
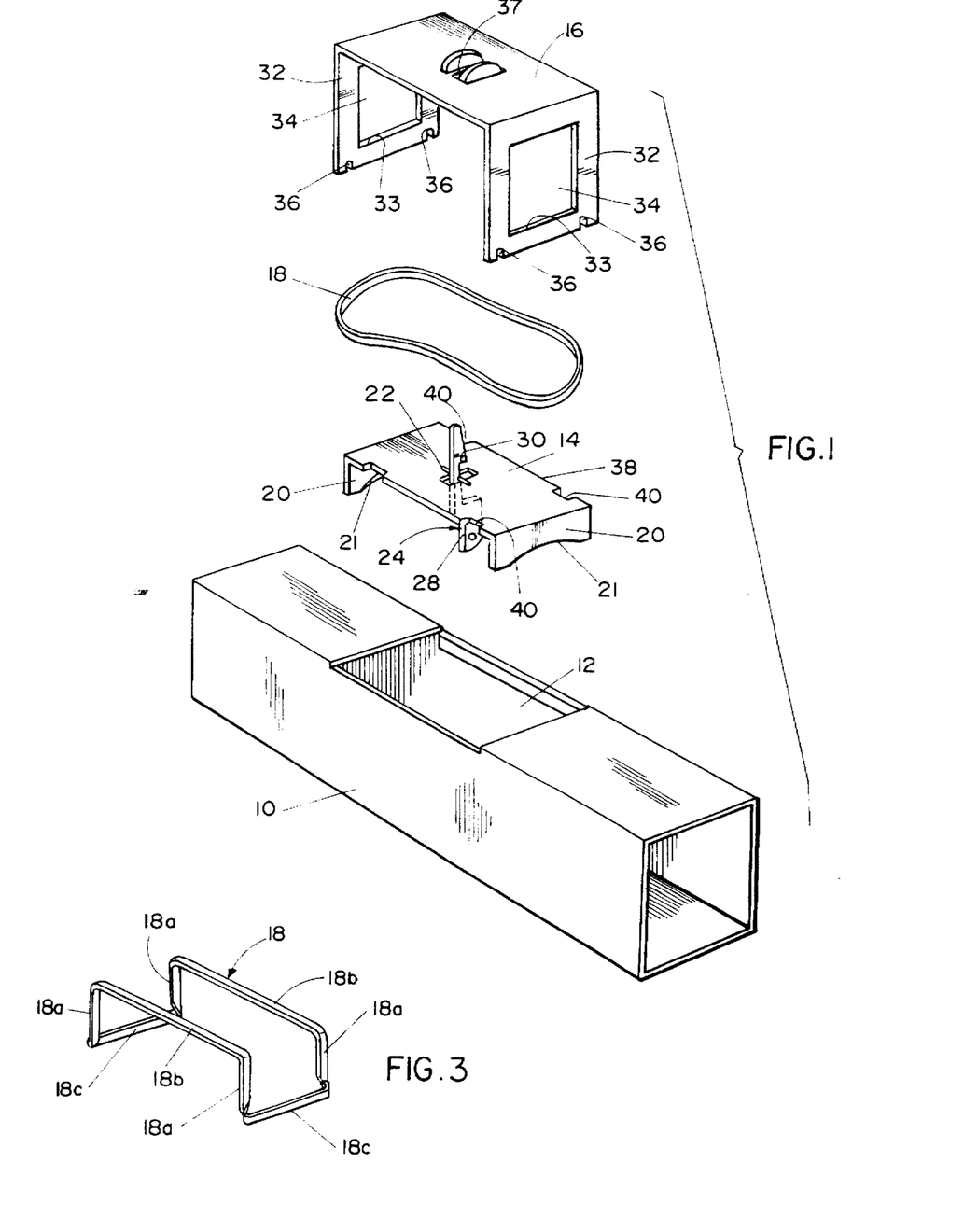
FIG. 1 is an exploded perspective view of the components of a rubber band powered mousetrap according to the invention.
FIG. 3 is a perspective view of the rubber band.

Referring initially to FIG. 1, a rubber band powered mousetrap includes an open-ended tunnel 10, preferably of cardboard or the like if the trap is to be of the disposable kind, but which can also be of plastic or other suitable material if the trap is to be of the re-usable kind. The tunnel is open at each end and is formed with a centrally located roof aperture 12 to receive a trapping mechanism which comprises a metal or plastic anchor plate 14, a metal or plastic striker plate 16 and an endless rubber band 18.

The anchor plate 14 has shallow depending end walls 20 preferably with arcuately profiled bottom edges 21 and a central aperture in which is mounted a pivotal trigger 24 on an axle 22 extending lengthwise of the anchor plate (relative to the tunnel 10). The trigger is thus mounted to pivot cross-wise in the tunnel and has a depending lobe 28 and an upper end with a catch or shoulder 30. The axle 22 may be attached to plate 14 by any suitable means.

Figures 4, 5:
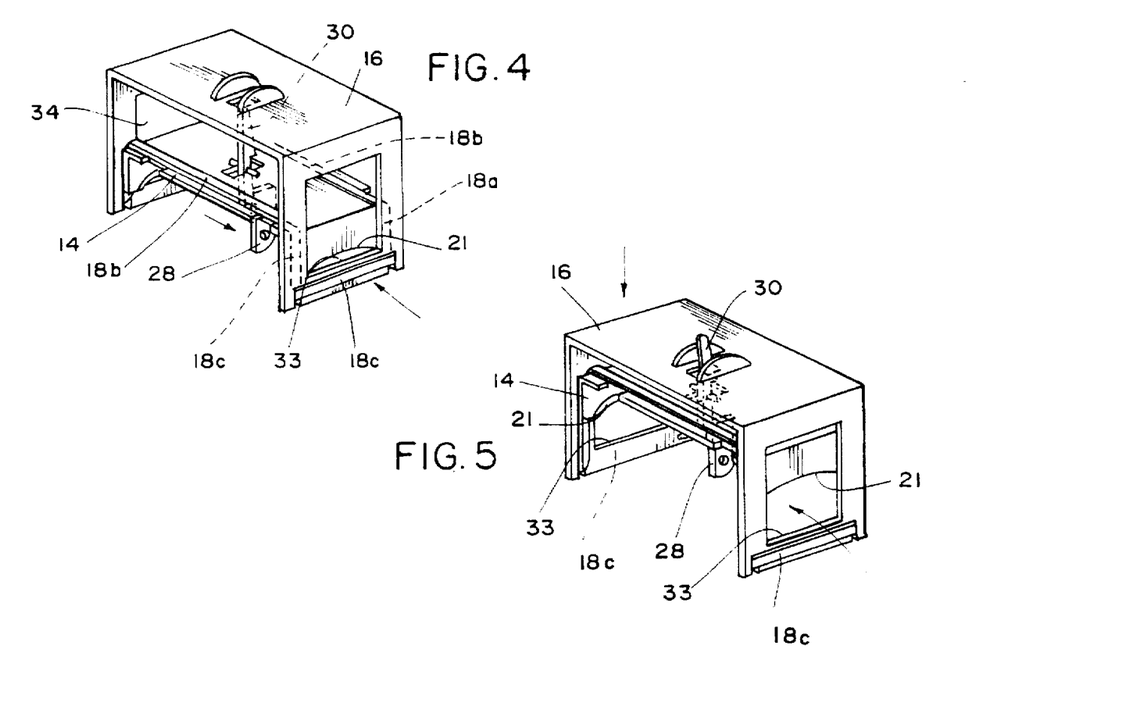
FIG. 4 is a perspective view of the trapping mechanism in a sprung position.
FIG. 5 is a perspective view of the trapping mechanism in the set position.

Striker plate 16 is dimensioned to fit over the anchor plate 14 and the striker plate also has depending end walls 32 with enlarged rectangular apertures 34. The end walls 32 are somewhat deeper than the end walls 20 of the anchor plate, being approximately the depth of tunnel 10 and are dimensioned to slide over the end walls 20 as seen in FIGS. 2–4 whereby trapping apertures are formed at each end of the mechanism between the arcuate bottom edges 21 of the anchor plate and edges 33 of the striker plate.

The rubber band 18 is wound between the anchor plate and the striker plate, in the configuration shown in FIG. 3. Thus, opposite ends of the band are fitted in notches 36 in the bottom of the striker plate and the band is run from the notches up between the end walls of the plates (runs 18a of the band), over the top of the plate 14 under plate 16 (runs 18b of the band) and across the bottom of plate 16 between notches 36 (runs 18c). The effect of the band winding is to urge the striker plate upwardly relative to the anchor plate into the sprung position of the mechanism shown in FIG. 4 where the striker plate is above the anchor plate and edges 33 of the striker plate approach edges 21 of the anchor plate.

Striker plate 16 has a central aperture 37 through which the top end of trigger 24 projects. To set the trapping mechanism, striker plate 16 is simply pressed downwards against the force of the rubber band until the trigger catch 30 engages against one edge of aperture 37. The trap is thus held in the set position (FIGS. 2 and 5) with plate 16 adjacent plate 14 and with the edges 33 pushed downwardly away form the edges 21.

Figure 2:
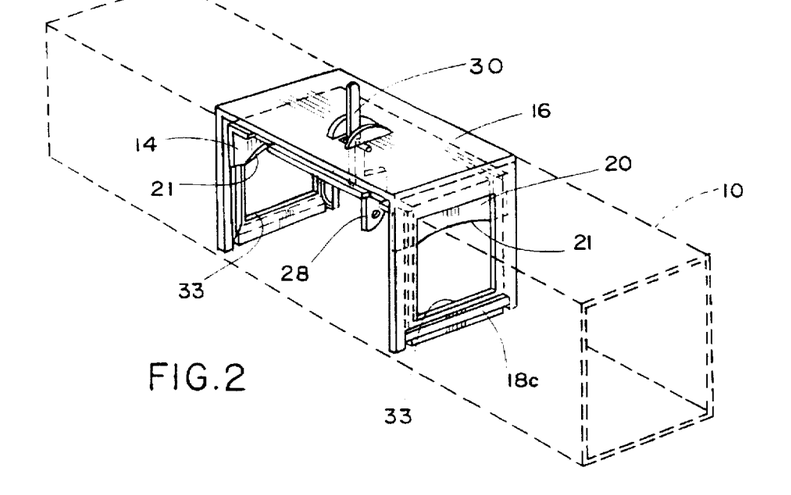
FIG. 2 is a perspective view of the assembled trap in a set position.

The trapping assembly may be fixed in position in tunnel aperture 12 by any convenient means, such that the anchor plate 14 is substantially flush with the top wall of the tunnel with the end walls of both plates projecting into the tunnel as shown in FIG. 2. To fix plate 14 in position, for example, the plate may have edge flanges 38 (FIG. 1) which sit on the opposite side walls of the tunnel defining aperture 12 and notches 40 for receiving another endless rubber band (not shown) wound in a like configuration to band 18, over flanges 38, through the notches 40, down the opposite sides of the tunnel and across the bottom of the tunnel. This is only one way of mounting the trapping structure in the tunnel and numerous other arrangements are possible.

Figure 6:
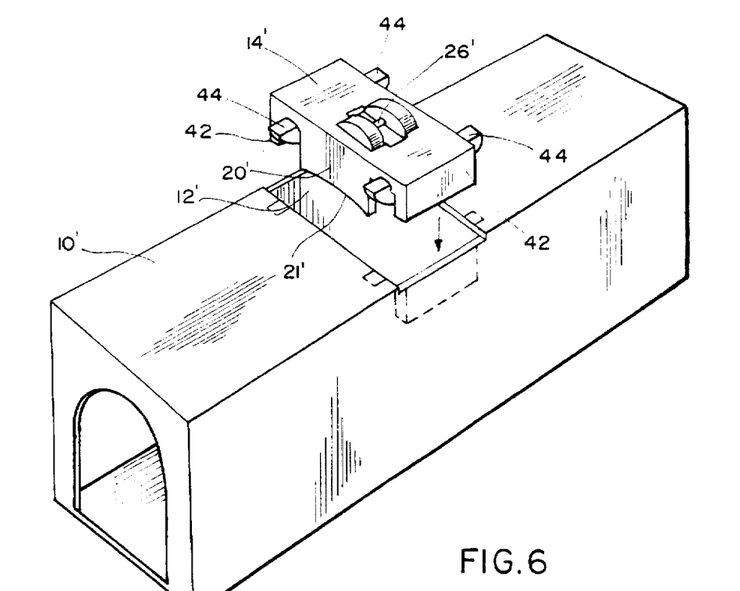
FIG. 6 is a perspective view of a modified trap, in which primed reference numerals are used to denote parts corresponding to similarly numbered parts in the previous figures.

FIG. 6, for example, shows an alternative, mounting arrangement for anchor plate 14' which in this case may be a plastic molding. Plate 14' has depending side flanges 42 to fit over the opposite side walls of tunnel 10' and curved surface ramp members 44 at its ends to fit under the top wall of the tunnel. The structure of the trapping mechanism and tunnel may otherwise be the same as in the previous embodiment.

With the trapping mechanism fitted in the tunnel as shown in FIG. 2 and the trapping mechanism in the sprung position shown in FIG. 4, in order to set the trap, it is simply necessary to push down on the striker plate 16 until the trigger catch 30 engages the striker plate. Then, when a mouse enters the tunnel from either end, sticks its head through one of the apertures 34 and dislodges the trigger with its snout, striker plate 16 springs up under the action of band 18 and catches the mouse's neck between edges 21 and 33. The mouse is thus trapped and cannot escape. An indication that the trap has been sprung is given by the raised striker plate. The tunnel may be suitably impregnated or pre-baited in the region of the trigger to attract mice.

FIGS. 7–12 show preferred commercial embodiments of the invention operating in like manner to the previously described trap but including certain additional and modified features.

Figure 7:
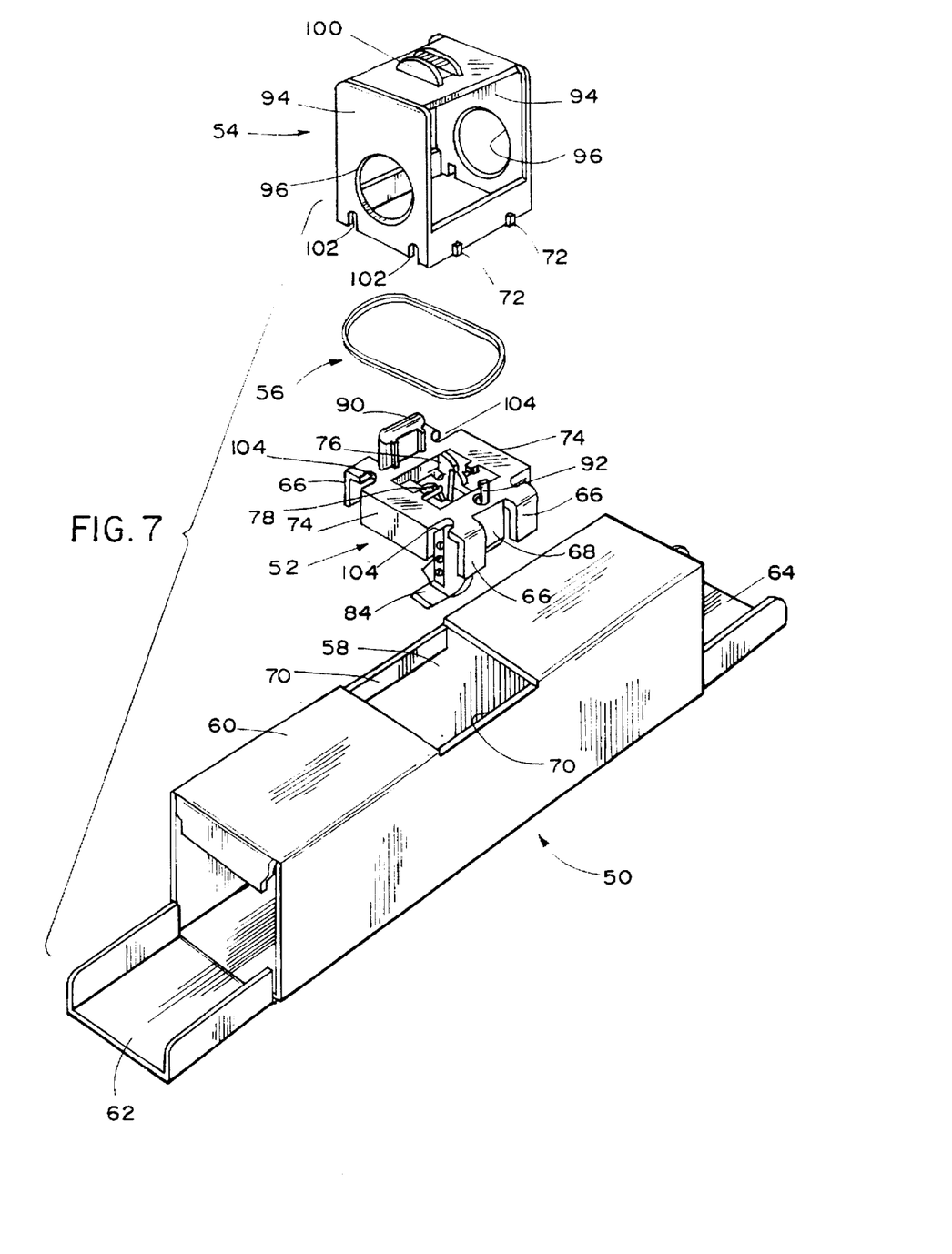
FIG. 7 is an exploded perspective view of a second embodiment rubber band powered trap.

Referring to FIG. 7, the trap comprises a cardboard tunnel 50 and a trapping mechanism which, as previously, includes an anchor plate 52, a striker plate 54 and an endless rubber band 56. The anchor plate and the striker plate in this case comprise respective plastic moldings and the trapping mechanism again fits in an aperture 58 cut in top wall 60 of the tunnel. The tunnel has fold out end walls 62, 64 which can be torn away when the trap is used or which can be folded down, as shown, to form ramps for the mouse. When the trapping mechanism is assembled by means of the rubber band, as in the previous embodiment, it is mounted in the aperture 58. In this case the anchor plate has, on each side, a pair of downwardly depending outer tabs 66 and a central recessed tab 68. Also, portions of the tunnel wall 60 which are cut to form aperture 58 are folded in to form flaps 70. The trapping mechanism is mounted in aperture 50 with parts of the side walls of the tunnel and the flaps 70 frictionally gripped between the tabs 66 and 68 of the anchor plate. Also, the striker plate has a pair of small projections 72 along each bottom side edge which function to center the mechanism and maintain it in a vertical orientation.

The anchor plate has end walls 74, as previously, the bottom edges of which combine with the striker plate end walls to define trapping apertures. A trigger 76 is again pivotally mounted in the top wall of anchor plate 52 on a pivotal axis 78 to be aligned lengthwise of tunnel 50 so that the trigger can pivot cross-wise of the tunnel. The upper projecting end of the trigger has a catch portion 80 with an upper camming surface 82. The lower end of the trigger has bait retaining means including flanges 84, apertures 86 and serrations 88. The trigger can also be impregnated with attractant.

On its top wall, the anchor plate is formed with an upwardly projecting ribbed flange 90 on one side and a removable hook-like safety tab 92 on the opposite side. Flange 90 serves as an abutment and guide for the strike plate to prevent any tendency for the striker plate to tilt and jamb when the trap is sprung. The tab 92 engages the top of the striker plate as shown in FIG. 8 and prevents the trap from being sprung until it is removed.

The striker plate 54 has end walls 94 with, in this case, circular apertures 96, the lower portions of which combine with the bottom edges of walls 74 of the anchor plate to form trapping apertures therebetween. The top wall of the striker plate again has a central aperture 98 (FIG. 9) through which the trigger passes and against one side of which the hook portion engages when the trap is set. Aperture 98 is covered by a raised enclosure 100 which protects the top of the trigger and prevents the trigger being released from the top when the trap is set. The end walls 94 of the striker plate have notches 102 for the rubber band and similar notches 104 are formed on opposite sides of the anchor plate.

As in the previous embodiment, the rubber band extends from outside the end walls of the striker plate through notches 102, up through the notches 104 and over the top of the anchor plate so that the striker plate is urged upwardly with respect to the anchor plate. In this case, however, one upper run of the band (see FIGS. 8 and 9) is fitted behind the trigger so as to elastically bias the trigger toward the set position.

Figure 8:
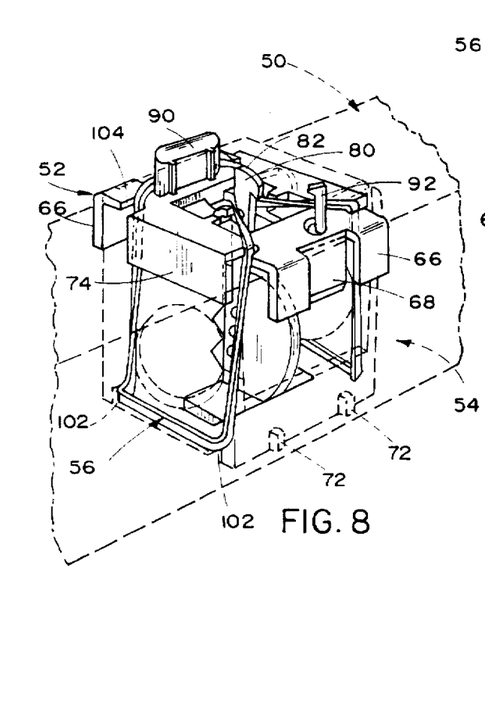
FIG. 8 is a perspective view of the trapping mechanism for the second embodiment trap shown in a set position.
Figure 9:
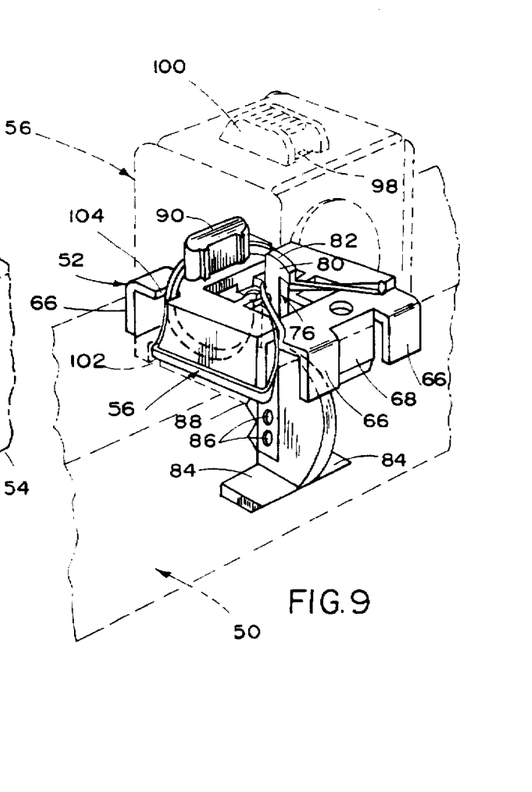
FIG. 9 is a view similar to FIG. 8 showing the trapping mechanism in a sprung position.

When the trapping mechanism is assembled into tunnel 50, the trap is set by pushing the striker plate down from the FIG. 9 position into the FIG. 8 position. In so doing, the camming surface 82 atop the trigger engages the edge of aperture 98 in the striker plate so that the trigger is moved against the bias of the rubber band and snaps into the set position with catch portion 80 on the top of the striker plate. Normally, the trap will be sold in the set condition with safety tab 92 preventing it from being inadvertently sprung. When the trap is to be used, tab 92 is removed and the trap can then be sprung when a mouse exerts a pivot force against the base of the trigger.

Figure 10:
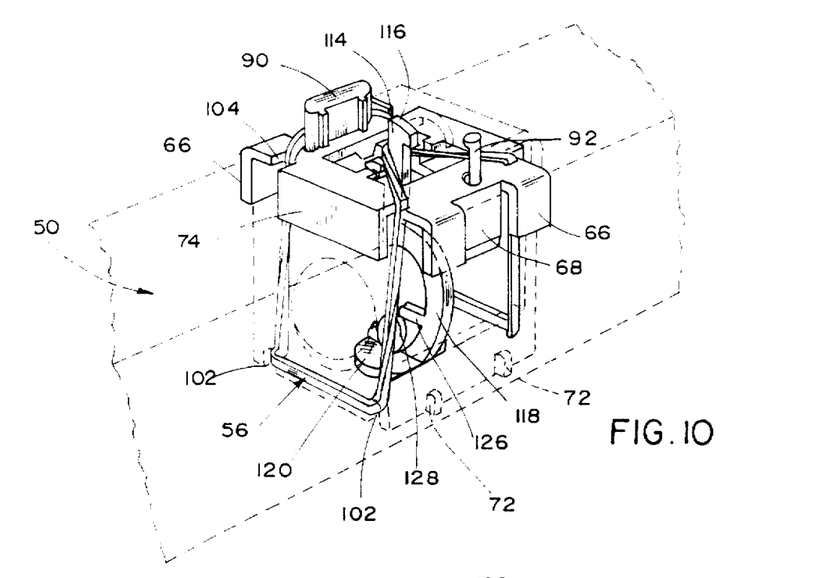
FIG. 10 is a view similar to FIG. 8, showing the second embodiment trapping mechanism used in conjunction with a preferred form of trigger.
Figure 11:
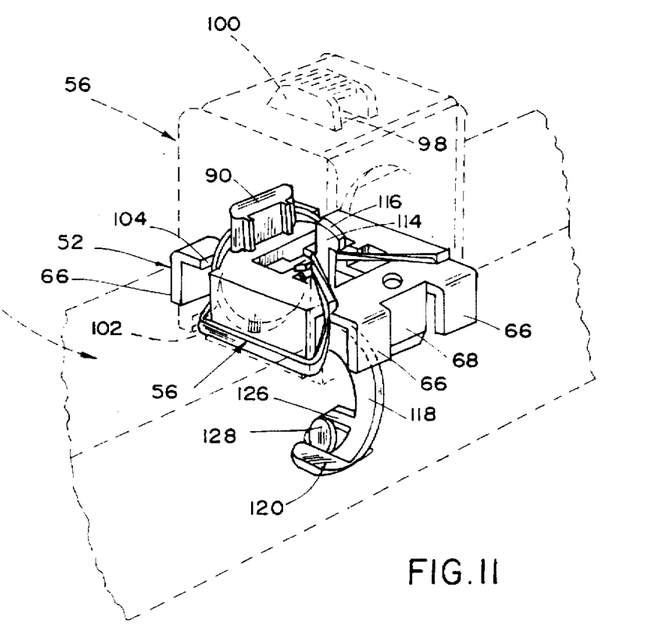
FIG. 11 is a view similar to FIG. 9 but showing the preferred trigger.
Figure 12:
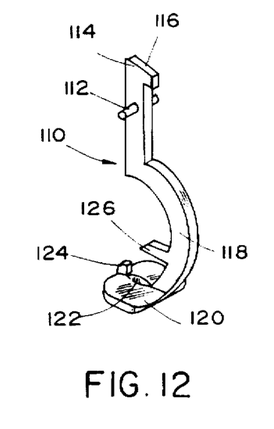
FIG. 12 is a perspective view of the preferred trigger.

The mouse traps thus far described function as "pass-through" designs wherein a mouse is caught while attempting to pass through the trap. FIGS. 10–12 illustrate an "interactive" design wherein a mouse is caught while interacting with bait.

The only effective difference between the traps shown in FIGS. 7–9 and 10–12 is the substitution of trigger 110 in FIGS. 10–12 for the trigger 76 in FIGS. 7–9. All other components of the trap and trapping mechanism are the same and the trapping mechanisms operate in like manner.

Trigger 110 is again pivotally mounted in the top wall of anchor plate 52 on a pivotal axis 112 so that the trigger again can pivot across tunnel 50. The upper projecting end of the trigger again has a catch portion 114 with an upper camming surface 116 (equivalent to elements 80 and 82 of trigger 76). In this case, however, the lower part of the trigger comprises a curved arm 118 terminating in an angled foot treadle 120. An oval notch or cutout 122 is formed in the treadle between the arm 118 and a projecting catch 124. A hook 126 is formed on the arm 118 above notch 122. The spacing of the components is such that a sunflower seed 128 can be gripped tightly in place between hook 126 and notch 122. The sunflower seed may be incorporated with the trigger when the trap is sold and may be used in conjunction with a scented mouse-attracting trigger. Alternatively, the bait may be adhered to the trigger by an adhesive in an obvious manner. Test results have shown that catch rates increase significantly with the addition of the sunflower seed. In use, a mouse is caught while interacting with the seed, having been attracted by the scented trigger. The angled foot treadle facilitates trigger release, should the mouse step on the treadle while attempting to reach the seed.

Figure 13:
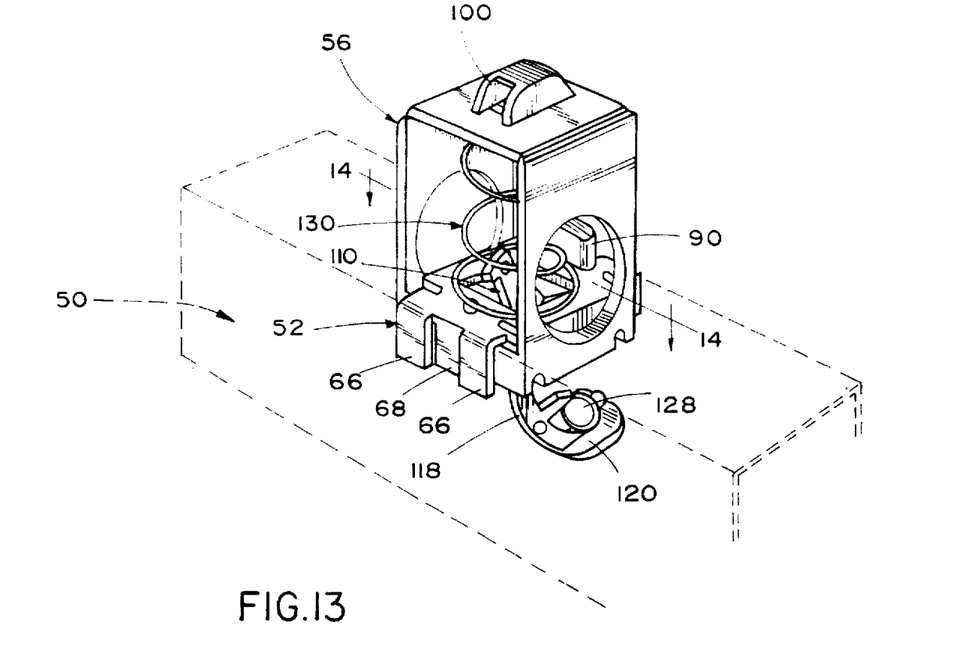
FIG. 13 is a perspective view showing parts of a spring-powered trap in the sprung position.
Figure 14:
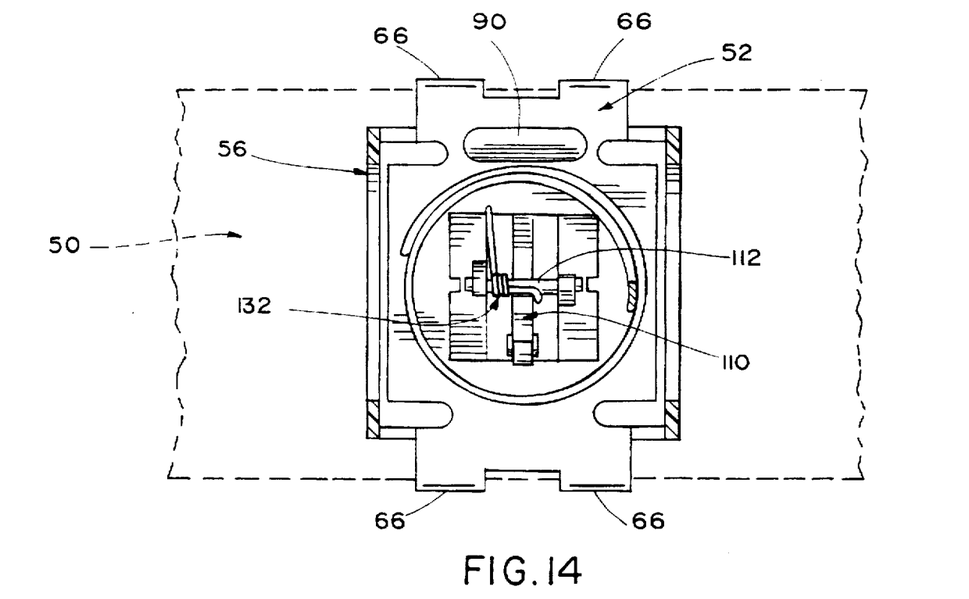
FIG. 14 is a sectional view on line 14—14 of FIG. 13.

FIGS. 13 and 14 show a trap which is substantially like the trap shown to FIGS. 10–12 and like references are used to denote like parts of the trap. In this embodiment, however, the rubber band 56 used in the previous trap is replaced by a coil spring 130 interfitted between the top walls of the anchor plate 52 and striker plate 56 and providing a similar upward force against the striker plate as does the rubber band. The spring may, for example, be used in place of the rubber band where a longer shelf life is required for the trap.

Also, in the absence of the rubber band, a second small coil spring 132 may be provided around the trigger axle 112 to urge the trigger toward the set position, a function performed by the rubber band wound around the trigger in the previous embodiment. It will be understood that the trap shown in FIGS. 13 and 14 functions in the same way as the trap shown in FIGS. 10–12. When the trap is set by pushing down on the striker plate, spring 130 becomes compressed between the plates. Also, the trap is again provided with a safety tab (like tab 92 in the previous embodiment) but this has been removed in the drawings.

While only preferred embodiments of the invention has been described herein in detail, the invention is not limited thereby and modifications can be made within the scope of the attached claims.

We claim:

1. A trapping mechanism for a mousetrap, said mechanism comprising an anchor plate having depending end walls each formed with a lower edge, a striker plate to fit over the anchor plate, the striker plate having depending walls to fit outside the end walls of the anchor plate, the end walls of the striker plate being deeper than the end walls of the anchor plate and each having an aperture therein with a bottom edge spaced below the lower edge of the respective anchor plate end wall to form a trapping aperture therebetween, a spring to be fitted between the plates and provide a force urging the striker plate upwardly with respect to the anchor plate into a sprung position wherein said bottom edges of the striker plate apertures approach the respective lower edges of the anchor plate end walls and wherein the striker plate can be pushed down against said force into a set position wherein said bottom edges are removed from said lower edges, and a trigger assembly carried by the anchor plate for releasably holding the striker plate in the set position wherein the trigger assembly comprises a trigger pivotally mounted in an aperture in the anchor plate, said trigger having a mouse engaging portion extending below the anchor plate between the anchor plate end walls and a catch portion projecting above the anchor plate, the striker plate including an opening to receive the catch portion of the trigger and having one edge to engage and retain the catch portion in the set position of the mechanism.

2. A trapping mechanism as claimed in claim 1, wherein the trigger assembly comprises a trigger pivotally mounted in an aperture in the anchor plate, said trigger having a mouse engaging portion extending below the anchor plate between the anchor plate end walls and a catch portion projecting above the anchor plate, the striker plate including an opening to receive the catch portion of the trigger and having one edge to engage and retain the catch portion in the set position of the mechanism.

3. A trapping mechanism as claimed in claim 1, wherein the opening in the striker plate is covered by an enclosure for preventing the trigger from being inadvertently released from above.

4. A trapping mechanism as claimed in claim 1, wherein the mouse engaging portion of the trigger includes bait attachment means.

5. A trapping mechanism as claimed in claim 4, wherein the bait attachment means comprises gripping means for a sunflower seed.

6. A trapping mechanism as claimed in claim 5, wherein the trigger includes a vertically extending arm and the gripping means includes a foot treadle at a lower end of said arm and a hook on the arm above the treadle for gripping a sunflower seed between the treadle and the hook.

7. A trapping mechanism as claimed in claim 6, including a seed-receiving notch in the treadle and a projecting stop on the treadle adjacent the notch.

8. A trapping mechanism as claimed in claim 5, wherein the trigger is impregnated with a mouse-attracting scent.

9. A trapping mechanism as claimed in claim 1, wherein the trigger is mounted on a pivot axle extending perpendicularly to the end walls of the anchor plate and wherein a second spring is provided around the axle for urging the trigger toward the set position wherein the catch portion engages said one edge of the opening in the striker plate.

10. A trapping mechanism as claimed in claim 1, including a guide flange for the striker plate extending upwardly from the anchor plate to engage and guide one edge of the striker plate when the mechanism is sprung preventing tilting of the striker plate tending to jamb the mechanism.

11. A trapping mechanism as claimed in claim 10, wherein the guide flange has vertical ribs engaging said edge of the striker plate.

12. A trapping mechanism as claimed in claim 1, in combination with a tunnel having a top wall with an aperture to receive said trapping mechanism wherein the anchor plate includes securing means for securing same to the tunnel substantially flush with said top wall with said anchor plate end walls projected into the tunnel.

13. A trapping mechanism as claimed in claim 12, wherein the securing means comprises tabs extending downwardly from the anchor plate on opposite edges of the anchor plate, said tabs gripping side walls of the tunnel defining said aperture therebetween.

14. A trapping mechanism as claimed in claim 1 wherein the spring comprises a coil spring.

* * * * *